United States Patent [19]

Karageozian

[11] 4,158,700

[45] Jun. 19, 1979

[54] METHOD OF PRODUCING RADIOACTIVE TECHNETIUM-99M

[76] Inventor: Hampar L. Karageozian, 25082 Morro Ct., Laguna Hills, Calif. 92653

[21] Appl. No.: 886,404

[22] Filed: Mar. 14, 1978

Related U.S. Application Data

[63] Continuation-in-part of Ser. No. 664,584, Mar. 8, 1976, abandoned.

[51] Int. Cl.² ............................................. C01G 57/00
[52] U.S. Cl. ................................ 423/2; 252/301.1 R; 423/49
[58] Field of Search .......................... 423/2, 49; 421/1; 252/301.1 R

[56] References Cited

U.S. PATENT DOCUMENTS

| | | | |
|---|---|---|---|
| 3,382,152 | 5/1968 | Lieberman et al. | 176/16 |
| 3,436,354 | 4/1969 | Gemmill et al. | 424/1 X |
| 3,468,808 | 9/1969 | Arino | 424/1 X |
| 3,519,385 | 7/1970 | Hurst et al. | 423/2 |
| 3,890,244 | 6/1975 | Carlin | 423/2 |

OTHER PUBLICATIONS

Pinajian, "International Journal of Applied Radiation and Isotopes," 17, 664–666 (1966).
Allen, "International Journal of Applied Radiation and Isotopes," 16, 332–334 (1965).

*Primary Examiner*—Edward A. Miller
*Attorney, Agent, or Firm*—Martin A. Voet

[57] ABSTRACT

A chromatographic process of producing high purity and high yield radioactive Technetium-99m. A solution containing Molybdenum-99 and Technetium-99m is placed on a chromatographic column and eluted with a neutral solvent system comprising an organic solvent and from about 0.1 to less than about 10% of water or from about 1 to less than about 70% of a solvent selected from the group consisting of aliphatic alcohols having 1-6 carbon atoms. The eluted solvent system containing the Technetium-99m is then removed leaving the Technetium-99m as a dry, particulate residue.

6 Claims, No Drawings

METHOD OF PRODUCING RADIOACTIVE TECHNETIUM-99M

REFERENCE TO EARLIER FILED APPLICATIONS

This application is a continuation-in-part of U.S. application Ser. No. 664,584 filed Mar. 8, 1976, and now abandoned

BACKGROUND OF THE INVENTION

1. Field of the Invention

The invention relates generally to a method for producing radioactive isotopes. More specifically, the invention relates to an improved chromatographic extraction method whereby Technetium-99m of high yield and high purity is produced.

2. Background of the Prior Art

Technetium-99m which has a half life of six hours, is produced by the spontaneous radioactive decay of Molybdenum-99, which has a half life of 67 hours. High purity Technetium-99m is used primarly as a radioisotope in medical research and diagnosis. Since the isotope sought to be used has such a short half life, it is common practice to ship the users of Technetium-99m Molybdenum-99. The user then separates the desired amount of Technetium-99m from the Molybdenum-99 as his needs require.

A variety of methods are disclosed in the prior art for separating Technetium-99m from Molybdenum-99. These prior art methods are quite different from the method disclosed herein.

One of these prior art methods, as exemplified by U.S. Pat. No. 3,436,354, is based on liquid-liquid extraction principles, whereby Molybdenum-99 and Technetium-99m are partitioned between two immiscible liquids by constant agitation. This process is non specific and in order to extract high purity Technetium-99m several repeated extractions are necessary; furthermore it allows chemically labile organic solvents to be exposed to strong mineral acids and alkalies, which results in the chemical degradation of the organic phase and contamination of the Technetium-99m.

A second prior art method, as exemplified by U.S. Pat Nos. 3,519,385 and 3,890,244, utilizes principles of precipitation and physical separation of the precipitated Molybdenum-99 from the soluble Technetium-99m by filtration or centrifugation.

A third prior art method as illustrated by U.S. Pat. No. 3,382,152, a paper by J. J. Pinajian "International Journal of Applied Radiation and Isotopes" 17, 664, 1966 and another paper by J. F. Allen "International Journal of Applied Radiation and Isotopes" 16, 334, 1965, each use principles of ion exchange chromatography. In this process an ion exchange column is first preconditioned with an acid solution. Then an acidified solution of Molybdenum-99 is loaded onto the column. The column is again conditioned by using an organic solvent before it is ready for elution with an acidified salt solution or an acidified organic solvent. The shortcomings of this process are (1) the several preconditioning steps that are necessary, (2) the unavailability of usable Technetium-99m on the first day of operation because of radionuclidic Molydenum-99 contamination and chemical alumina contamination, (3) possible degradation of the organic solvent because of acid exposure and (most importantly) (4) because of the relatively low yields of Technetium-99m, e.g., 65–75% yields of Technetium-99m which may be contaminated with radioactive iodine.

The fourth prior art method, as illustrated by U.S. Pat. No. 3,468,808, utilizes chemical reactions between Molybdenum-99 and zirconium oxide, thus allowing Technetium-99m to be eluted from the column using ionic solutions or using an organic solvent.

A further drawback of some of the foregoing methods is that the Technetium-99m is produced in the form of an aqueous solvent whereas production in a solventless, i.e. dry particulate form, would be more desirable for purposes of flexibility in the preparation of diagnostic reagents of desired radioactive concentration. It would be desirable to have a method for producing Technetium-99m in dry, particulate form in high yield and purity, i.e., free from contamination with Molybdenum-99.

SUMMARY OF THE INVENTION

I have now discovered a method of producing Technetium-99m in a solventless, i.e., dry, particulate form of high yeild and high purity.

The invention herein described relates to a method for producing Technetium-99m in a dry, particulate form comprising eluting an adsorbant chromatographic material containing Molybdenum-99 and Technetium-99m with a neutral solvent system comprising an organic solvent containing from about 0.1 to less than about 10% water or from about 1 to less than about 70% of a solvent selected from the group consisting of aliphatic alcohols having 1–6 carbon atoms and separating the solvent system from the eluate whereby a dry, particulate residue is obtained containing Technetium-99m, said residue being substantially free of Molybdenum-99.

DETAILED DESCRIPTION OF THE INVENTION

The present invention provides a high yield process for producing high purity Technetium-99m in dry, particulate form. The process involves selectively eluting a Technetium-99m composition from a chromatographic column containing a mixture of Technetium-99m and Molybdenum-99 (the parent of Technetium-99m ) with a neutral solvent system comprising an organic solvent containing a second solvent, as described in more detail below. The solvent system containing the Technetium-99m is then separated from the eluate to leave a dry, particulate residue containing Technetium-99m. The resulting Technetium-99m may then be used for diagnostic techniques by combining it with suitable carriers, e.g. saline at a desired concentration. Molybdenum-99 is obtained from conventional sources such as by irradiating a molybdenum compound or by using fission product molybdenum. Useful molybdenum-containing compounds include molybdenum trioxide, molybdic acid, sodium molybdate, ammonium molybdate, molybdenum metal dissolved in an acid to form a salt and the like.

A conventional chromatographic container, e.g. a column, is used in this invention. The chromatographic container should be made of a material which is inert to the solvent system, e.g. stainless steel, glass, polypropylene, Teflon or any other organic solvent-resistant material.

Chromatographic packing material which may be used in this invention are those adsorbant materials which allow selective elution of Technetium -99m. That is, the chromatographic material must have the property of selectively retaining Molybdenum-99 and other radionuclidic impurities while allowing Technetium-99m to be removed in the solvent system. Specific chromatographic packing materials which may be used in this invention include activated aluminum oxide, both neutral, basic and acidic forms, i.e. aluminum oxide particles coated with a thin layer of aluminum oxycarbonate; aluminum oxide, i.e., alumina, aluminum hydroxide and magnesium aluminum silicate. Other column packing materials which may be used include aluminum silicate, barium hydroxide, bentonite, calcium oxide, magnesium hydroxide, and ferric oxide. The preferred column packing material is activated aluminum oxide.

The neutral solvent system is selected so that it will selectively and preferentially elute the Technetium-99m and leave the Molybdenum-99 in the chromatographic column. The solvent system comprises an organic solvent and a second solvent. Organic solvents which may be used in the present invention include acetone, methyl ethyl ketone, diethyl ketone, ethyl acetate and mixtures thereof. The preferred organic solvents are the ketones and preferably methyl ethyl ketone.

The second solvent may be water, in an amount ranging from about 0.1 to less than about 10% and preferably about 1 to about 7%, or an aliphatic alcohol containing 1-6 carbon atoms in an amount ranging between about 1 to less than about 70% and preferably from about 10 to about 50%. Typical examples of aliphatic alcohols which may be used in this invention include methanol, ethanol, isopropyl alcohol, butanol and hexanol and preferably ethanol.

I have discovered that the second solvent discussed above is critical to the present invention. As illustrated by the Examples, the use of the second solvent in the solvent system remarkably increases yield and purity of the eluted Technetium-99m. The use of excess second solvent results in an eluate contaminated with Molybdenum-99.

In carrying out the invention, a measured amount of a neutral aqueous solution containing Molybdenum-99 is dispersed in a chromatographic column containing a suitable chromatographic packing material, e.g. activated chromatographic grade aluminum oxide. In order to achieve the highest recovery of Technetium-99m by this method, the Technetium-99m should be in its highest oxidation state. Therefore, it is preferred to add a suitable amount of conventional chemical oxidizing agent to the aqueous solution containing Molybdenum-99 prior to dispersing it on the column. Oxidizing agents which may be used include sodium hypochlorite, hydrogen peroxide and the like.

The chromatographic column is then eluted with the neutral solvent system hereinbefore described. The elution may be assisted by positive pressure exerted at the top of the column, as by an inert pressurized gas, or by applying a reduced pressure on the lower end of the chromatographic column.

The resultant eluate, containing the solvent system and Technetium-99m is then preferably filtered through a conventional sterile filter e.g. 0.22–0.45μ, to remove all bacterial contamination. The solvent system is then separated from the Technetium-99m by any suitable conventional means and preferably by evaporation e.g. conventional vacuum or heating methods may be used. After the solvent system has been removed, the Technetium-99m remains as a dry, particulate residue.

The resultant residue may be recovered in any convenient manner, e.g. by redissolving in the desired amount of a suitable liquid, such as, for example, saline. The recovered Technetium-99m is then used as desired for medical, diagnostic or other uses.

As is apparent from the foregoing, the present method allows Technetium-99m to be prepared in a consistent, desired concentration. This is in comparison to the prior art methods wherein the eluate from a given chromatographic column is obtained in steadily decreasing concentrations as the Molybdenum-99 decays. The exact chemical form of the technetium compound produced by the herein described method is not completely known. Knowledge of the exact compound, however, is not important because the Technetium-99m obtained by the practice of this invention is in usable form. In addition, it should be noted that ordinary precautions for protection against radiation should be used in the carrying out of this invention.

The following examples are given for the purpose of illustrating the invention and are not intended to limit the scope of this invention.

In the following examples, the indicated solutions of radioactive molybdenum salts were introduced onto the indicated chromatographic column containing the indicated chromatographic packing material. On the indicated day in 7- or 8-day cycles, the indicated solvent system was used to elute the column. The resultant eluate was in all cases clear and colorless. The eluate made in each example was then evaporated to dryness. The residue (containing Technetium-99m) was then dissolved in saline (isotonic) to form clear, colorless solutions. The yields and purity for each sample is reported. Purity in each instance was determined by USP Standard XIX, which requires a purity of no more than 1 microcurie of molybdenum-99 per millicure of Technetium-99m.

EXAMPLE I

Chromatographic column—Glass
Column packing—6 grams activated aluminum oxide
Column load—0.1 ml sodium molybdate aqueous solution containing 10% by weight sodium hypochlorite and having 50 millicuries of activity
Solvent system—20 ml portions of anhydrous methyl ethyl ketone (for each day's elution)

The results are shown in Table 1 below.

Table 1

| Day of Week | Yield (%) Technetium-99m | Pass USP XIX |
| --- | --- | --- |
| 1 | 96 | yes |
| 2 | 81 | yes |
| 5 | 70 | yes |
| 6 | 68 | yes |
| 7 | 57 | yes |

As seen in Example I, the purity of the Technetium-99m is good, but the yield decreases to almost one-half by the end of the first week of elution.

EXAMPLE II

Example I was repeated, except the solvent system contained 1% water. The results are shown in Table 2 below.

Table 2

| Day of Week | Yield (%) Technetium-99m | Pass USP XIX |
|---|---|---|
| 1 | 99 | yes |
| 2 | 95 | yes |
| 5 | 93 | yes |
| 6 | 95 | yes |
| 7 | 94 | yes |
| 8 | 94 | yes |

As seen from the Example II, the yield remains above 90% for all elutions in the presence of a minor amount of water in the solvent system.

EXAMPLE III

Example I was repeated, except the chromatographic column was made of polypropylene and the solvent system consisted of two 10 ml portions of MEK saturated with water (approximately 12.5%). The results are shown in Table 3 below.

Table 3

| Day of Week | Yield (%) Technetium-99m | Pass USP XIX |
|---|---|---|
| 1 | 97 | yes |
| 2 | 99 | yes |
| 5 | 93 | yes |
| 6 | 115 | no |

The foregoing example demonstrates that when an excessive amount of water is used in the solvent system, the yields are high, but contamination results.

EXAMPLE IV

Example III was repeated, except the column load contained 80 millicuries of activity and the solvent system consisted of 20 ml portions of MEK containing 3% water. The results are shown in Table 4 below.

Table 4

| Day of Week | Yield (%) Technetium-99m | Pass USP XIX |
|---|---|---|
| 1 | 95 | yes |
| 2 | 91 | yes |
| 5 | 90 | yes |
| 6 | 91 | yes |
| 7 | 94 | yes |
| 8 | 96 | yes |

EXAMPLE V

Example IV was repeated except the column load consisted of 0.5 ml of sodium molybdate solution containing ten percent by volume sodium hypochlorite and having 300 millicuries of activity and the solvent system consisted of 20 ml portions of MEK containing 2% water. The results are shown in Table 5 below.

Table 5

| Day of Week | Yield (%) Technetium-99m | Pass USP XIX |
|---|---|---|
| 1 | 98 | yes |
| 2 | 97 | yes |
| 5 | 94 | yes |
| 6 | 95 | yes |
| 7 | 96 | yes |
| 8 | 96 | yes |

The foregoing Example shows that increasing the level of activity in the column load does not alter the consistent and high yield levels of Technetium-99m.

EXAMPLE VI

Example V is repeated, except 5% water is used in the solvent system. The results are shown in Table 6 below.

Table 6

| Day of Week | Yield (%) Technetium-99m | Pass USP XIX |
|---|---|---|
| 1 | 96 | yes |
| 2 | 96 | yes |
| 5 | 92 | yes |
| 6 | 93 | yes |
| 7 | 91 | yes |
| 8 | 92 | yes |

EXAMPLE VII

Example II was repeated, except the solvent system contained 7% water. The results are shown in Table 7 below.

Table 7

| Day of Week | Yield (%) Technetium-99m | Pass USP XIX |
|---|---|---|
| 1 | 92 | yes |
| 2 | 92 | yes |
| 5 | 90 | yes |
| 6 | 93 | yes |
| 7 | 89 | yes |

For the following Examples, a molybdenum/Technetium-99m test solution was prepared by first preparing a molybdenum solution by dissolving 12.0 grams of molybdenum trioxide in 20 ml of 6N sodium hydroxide solution. 2 ml of 3% hydrogen peroxide was added and the solution was made up to 30 ml using purified water. 5.5 ml of Technetium-99m solution containing 100 millicuries of activity was then added to 5 ml of the molybdenum solution to form the test solution.

EXAMPLE VIII

Chromatographic column—polypropylene
Column packing—6 g. alumina
Column load—0.5 ml of test solution containing 4.5 millicuries of activity
Solvent system—20 ml portion of MEK containing 10% ethanol Elution of the column gave greater than 99% recovery of Technetium-99m with a negative determination (less than 2 micrograms) of molybdenum.

EXAMPLE IX

Example VIII was repeated, except isopropyl alcohol was used instead of ethanol. Elution of the column gave greater than 99% recovery of Technetium-99m with a negative determination (less than 2 micrograms) of molybdenum.

EXAMPLE X

Example VIII was repeated, except the solvent system consisted of acetone containing approximately 8% water. Elution of the column gave greater than 98% recovery of Technetium-99m with a negative determination (less than 2 micrograms) of molybdenum.

EXAMPLE XI

Example VIII was repeated, except 5 columns (A-E) were used, each column containing 6 grams of activated alumina, basic and 0.2 ml of test solution. Each of the columns was eluted with 25 ml of the indicated solvent. The results are shown in Table 8 below.

Table 8

| Column | Solvent MEK/ethanol (v/v) | Molybdenum level in eluate |
|--------|---------------------------|----------------------------|
| A | 50/50 | less than 2 µg |
| B | 30/70 | less than 2 µg |
| C | 20/80 | more than 2 µg |
| D | 10/90 | more than 2 µg |
| E | 0/100 | more than 2 µg |

This Example demonstrates that levels of alcohol less than about 70% do not allow excessive molybdenum to pass through the column.

I claim:

1. A method for producing Technetium-99m in a dry, particulate form comprising eluting an adsorbant chromatographic material containing Molybdenum-99 and Technetium-99m with a neutral solvent system comprising an organic solvent selected from the group consisting of acetone, methyl ethyl ketone, diethyl ketone, ethyl acetate and mixtures thereof and (a) about 0.1 to less than about 10% water or (b) from about 1 to less than about 70% of an aliphatic alcohol having 1-6 carbon atoms and separating the solvent system from the eluate whereby a dry, particulate residue is obtained containing Technetium-99m, said residue being substantially free of Molybdenum-99.

2. The method of claim 1 wherein the chromatographic material is activated aluminum oxide.

3. The method of claim 1 wherein the organic solvent is methyl ethyl ketone.

4. The method of claim 1 wherein the aliphatic alcohol is ethanol.

5. The method of claim 1 wherein the solvent system is separated by evaporation.

6. A method for producing Technetium-99m in a dry, particulate form in high yield and purity comprising eluting a chromatographic column containing activated aluminum oxide, Molybdenum-99 and Technetium-99m with a neutral solvent system comprising methyl ethyl ketone containing (a) about 0.1 to less than about 10% water or (b) about 1 to less than about 70% ethanol, and separating the solvent system from the eluate by evaporation whereby a dry, particulate residue is obtained containing Technetium-99m, said residue being substantially free of Molybdenum-99.

* * * * *